US012614560B2

(12) United States Patent
Ikeshita et al.

(10) Patent No.: US 12,614,560 B2
(45) Date of Patent: Apr. 28, 2026

(54) REVERBERATION REMOVAL DEVICE, PARAMETER ESTIMATION DEVICE, REVERBERATION REMOVAL METHOD, PARAMETER ESTIMATION METHOD, AND PROGRAM

(71) Applicant: NTT, Inc., Tokyo (JP)

(72) Inventors: Rintaro Ikeshita, Tokyo (JP); Naoyuki Kamo, Tokyo (JP); Tomohiro Nakatani, Tokyo (JP)

(73) Assignee: NTT, Inc., Tokyo (JP)

( * ) Notice: Subject to any disclaimer, the term of this patent is extended or adjusted under 35 U.S.C. 154(b) by 203 days.

(21) Appl. No.: 18/274,767

(22) PCT Filed: Feb. 4, 2021

(86) PCT No.: PCT/JP2021/004097
§ 371 (c)(1),
(2) Date: Jul. 28, 2023

(87) PCT Pub. No.: WO2022/168230
PCT Pub. Date: Aug. 11, 2022

(65) Prior Publication Data
US 2024/0105202 A1 Mar. 28, 2024

(51) Int. Cl.
*G10L 21/0232* (2013.01)

(52) U.S. Cl.
CPC ................................ *G10L 21/0232* (2013.01)

(58) Field of Classification Search
None
See application file for complete search history.

(56) References Cited

U.S. PATENT DOCUMENTS

| | | | | |
|---|---|---|---|---|
| 9,558,757 | B1 * | 1/2017 | Li | G10L 21/0208 |
| 2010/0316228 | A1 * | 12/2010 | Baran | H04M 9/082<br>381/66 |
| 2011/0002473 | A1 * | 1/2011 | Nakatani | H04S 7/305<br>381/66 |
| 2016/0203828 | A1 * | 7/2016 | Gomez | G10L 15/20<br>704/226 |
| 2017/0365271 | A1 * | 12/2017 | Kupryjanow | G10L 25/21 |
| 2018/0182410 | A1 * | 6/2018 | Kaskari | G10L 25/18 |

FOREIGN PATENT DOCUMENTS

| | | |
|---|---|---|
| JP | 2019144320 A | 8/2019 |
| JP | 2020038315 A | 3/2020 |

OTHER PUBLICATIONS

Ikeshita et al. (2021) "Blind Signal Dereverberation Based on Mixture of Weighted Prediction Error Models" IEEE Signal Processing Letters, vol. 28, pp. 399-403.
Yoshioka et al. (2012) "Generalization of multi-channel linear prediction methods for blind MIMO impulse response shortening," IEEE Transactions on Audio, Speech, and Language Processing, pp. 2707-2720.

* cited by examiner

*Primary Examiner* — Daniel C Washburn
*Assistant Examiner* — Tyler Becker

(57) ABSTRACT

Provided is a reverberation removal device that is highly accurate even in noisy environments and underdetermined conditions. Reverberation is removed by applying a plurality of reverberation prediction filters to an observation signal while switching the plurality of reverberation prediction filters according to each time frequency bin of the observation signal.

6 Claims, 5 Drawing Sheets

REVERBERATION REMOVAL DEVICE, PARAMETER ESTIMATION DEVICE, REVERBERATION REMOVAL METHOD, PARAMETER ESTIMATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2021/004097, filed on 4 Feb. 2021, the disclosure of which is hereby incorporated herein by reference in its entirety.

TECHNICAL FIELD

The present invention relates to a reverberation removal device, a parameter estimation device, a reverberation removal method, a parameter estimation method, and a program.

BACKGROUND ART

A dereverberation technique for removing reverberation from an observed mixed sound signal is a technique widely used for preprocessing of speech recognition or the like. A weighted prediction error (WPE, NPL 1) is known as a method for removing reverberation from an observed mixed sound signal by using one or more microphones.

CITATION LIST

Non Patent Literature

[NPL 1] Takuya Yoshioka and Tomohiro Nakatani, "Generalization of multi-channel linear prediction methods for blind MIMO impulse response shortening," IEEE Transactions on Audio, Speech, and Language Processing, pp. 2707-2720, 2012.

SUMMARY OF INVENTION

Technical Problem

WPE has a problem that dereverberation performance is deteriorated due to model errors under a noise environment or under a poor determination condition (where the number of sound sources is larger than the number of microphones).

In view of the foregoing problem, the present invention aims to provide a reverberation removal device that is highly accurate even in noisy environments and underdetermined conditions.

Solution to Problem

A reverberation removal device of the present invention removes reverberation by applying a plurality of reverberation prediction filters to an observation signal while switching them according to each time frequency bin of the observation signal.

Advantageous Effects of Invention

The reverberation removal device of the present invention is highly accurate even under noisy environments or underdetermined conditions.

DESCRIPTION OF EMBODIMENTS

Figure 1:
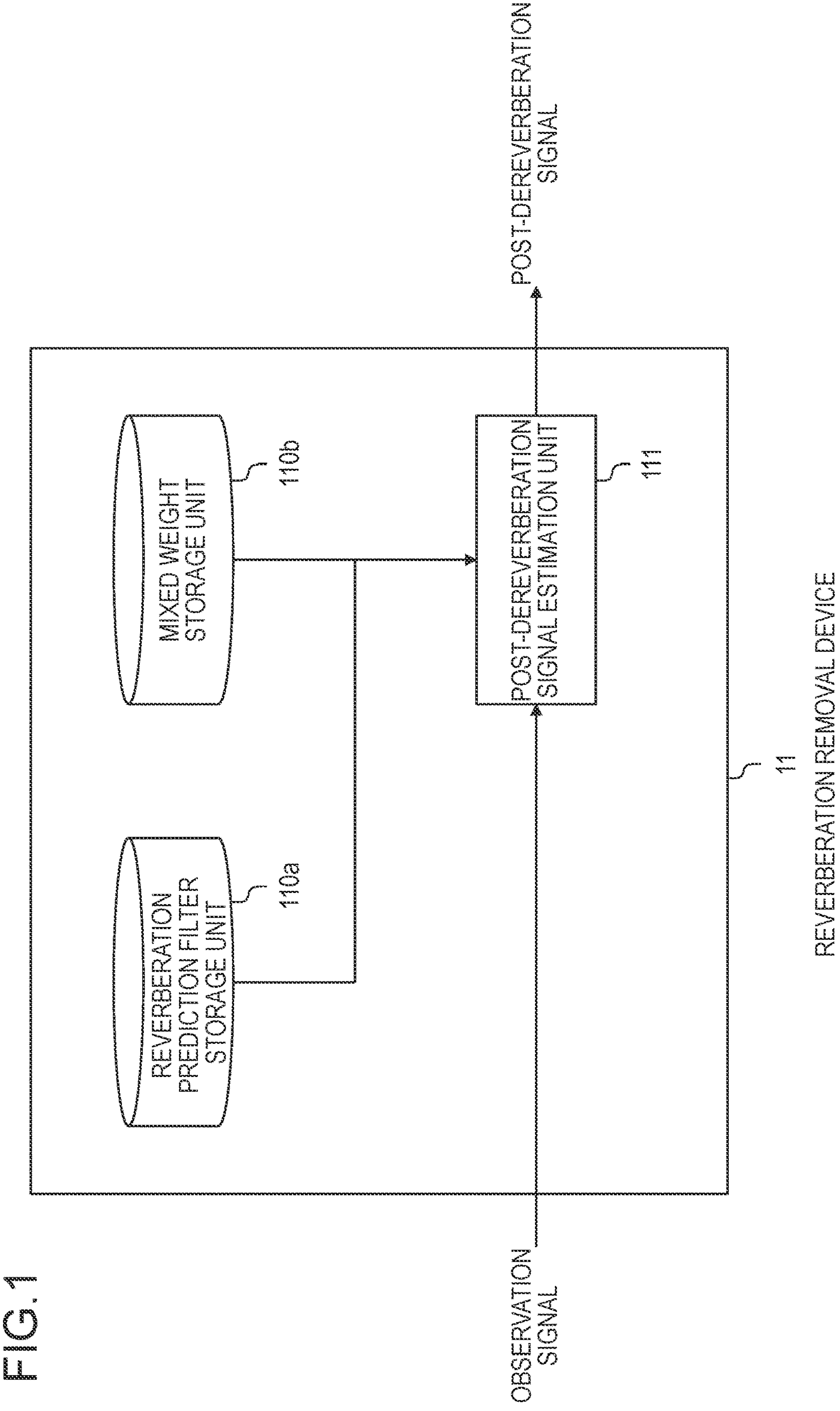
FIG. 1 is a block diagram showing a functional configuration of a reverberation removal device according to Example 1.

Hereinafter, embodiments of the present invention will be described in detail. It should be noted that components having the same function are given the same number, and overlapping descriptions thereof are omitted accordingly.

Example 1

First, a reverberation removal method (Switching WPE) disclosed in the present invention will be described.

The dereverberation problem to be solved by the present invention is:

[Math. 1]

$$x_{f,t}=\sum\nolimits_{\tau=0}^{N_1}A_{f,\tau}s_{f,t-\tau}+n_{f,t}\in C^M, \tag{1}$$

$$A_{f,\tau}\in C^{M\times K},\ s_{f,t}\in C^K,\ n_{f,t}\in C^M, \tag{2}$$

a problem of estimating the following equation 2, which is a signal obtained after dereverberation, from an observation signal x expressed in equation 1 above.

[Math. 2]

$$z_{f,t}:=\sum\nolimits_{\tau=0}^{N_2}A_{f,t}s_{f,t-\tau}+n'_{f,t}\in C^M, \tag{3}$$

Note that M is the number of microphones, K the number of sound sources, f the number of frequency bins (f=1, . . . , F), t a time frame (t=1, . . . , T), $s_{f,t}\in C^K$ a vector composed of K sound source signals, $n_{f,t}\in C^M$ a background noise, $\{A_{f,\tau}\}^{N_1}{}_{\tau=0}\subset C^{M\times K}$ an acoustic/indoor impulse response from a sound source to a microphone, $N_2$ satisfies $0\le N_2<<N_1$, the first term of equation (3) represents direct and initial reflection components (the purpose of removing reverberation components in the latter half) of the K sound source signals, and the second term of equation (3) represents a noise signal $n'_{f,t}$ which may be different from an original noise signal $n_{f,t}$.

Equations (4), (5) and (6) represent a model of the Switching WPE of the present invention. However, since the dereverberation problem can be handled independently for each frequency bin, the index f of the frequency bin will be omitted hereinafter.

[Math. 3]

$$p(x)=\prod_{t=1}^{T}\left[\sum_{i=1}^{n}\alpha_{t,i}CN(z_{t,i}\mid 0_M,\lambda_t I_M)\right],\tag{4}$$

$$z_{t,i}=x_t-G_i^h\bar{x}_t\in C^M,\ \lambda_t\geq\varepsilon,\tag{5}$$

$$\alpha_{t,i}\in\{0,1\},\ \sum_{i=1}^{n}\alpha_{t,i}=1.\tag{6}$$

Here, $0_M\in C^M$ is a zero vector, $I_M\in C^{M\times M}$ is a unit matrix, $$\lambda=\{\lambda_t\}_{t=1}^{T}$$

is a power spectrum density of $$\{z_t\}_{t=1}^{T}$$

averaged over the entire microphone, $G_1, \ldots, G_n$ are filters of WPE (reverberation prediction filters), ε>0 is a small constant, $$\{\alpha_{t,i}\}_{i=1}^{n}$$

in a time frame t is a mixed weight (binary), and $z_{t,i}$ is a signal obtained after dereverberation.

Note that $x^-_t$ is expressed as follows.

[Math. 4]

$$\bar{x}_t=\begin{bmatrix}x_{t-\delta_1}\\ \vdots\\ x_{t-\delta_p}\end{bmatrix}\in C^{M_p}\tag{7}$$

The $x^-_t$ means an observation signal in a predetermined section ($t-\delta_1$~$t-\delta_p$) past the time frame t.

Parameters to be estimated in this model are the following three parameters.

1) n reverberation prediction filters $G_1, \ldots, G_n$
2) The power spectrum $\lambda_t$(t=1, . . . , T) of the signal obtained after dereverberation
3) The mixed weight $\{\alpha_{t,i}\}^n_{i=1}$(t=1, . . . , T)

The reverberation removal method Switching WPE disclosed in the present invention matches the conventional reverberation removal method WPE when n=1.

The Switching WPE disclosed in the present invention reduces model errors that have been a problem in the WPE and improves dereverberation performance by switching between a plurality of reverberation prediction filters $G_1, \ldots, G_n$ to use the most appropriate dereverberation filter in each time frequency bin.

«Dereverberation Device 11»

A functional configuration of a reverberation removal device 11 for removing reverberation by using the parameters obtained by the aforementioned Switching WPE will be described with reference to FIG. 1.

The reverberation removal device 11 of the present example is characterized in that a plurality of reverberation prediction filters are applied to an observation signal while switching them according to each time frequency bin of the observation signal, thereby removing reverberation.

As shown in the diagram, the reverberation removal device 11 of the present example includes a reverberation prediction filter storage unit 110*a*, a mixed weight storage unit 110*b*, and a post-dereverberation signal estimation unit 111.

<Reverberation Prediction Filter Storage Unit 110*a*>

The reverberation prediction filter storage unit 110*a* stores a plurality of (n) reverberation prediction filters $G_1, \ldots, G_n$ that are estimated by the Switching WPE described above.

<Mixed Weight Storage Unit 110*b*>

The mixed weight storage unit 110*b* stores a mixed weight $\{\alpha_{t,i}\}^n_{i=1}$(t=1, . . . , T) estimated by the Switching WPE described above. The mixed weight is a binary vector that determines which one of the reverberation prediction filters $G_1, \ldots, G_n$ should be applied in accordance with each time frequency bin.

<Post-Dereverberation Signal Estimation Unit 111>

Figure 2:
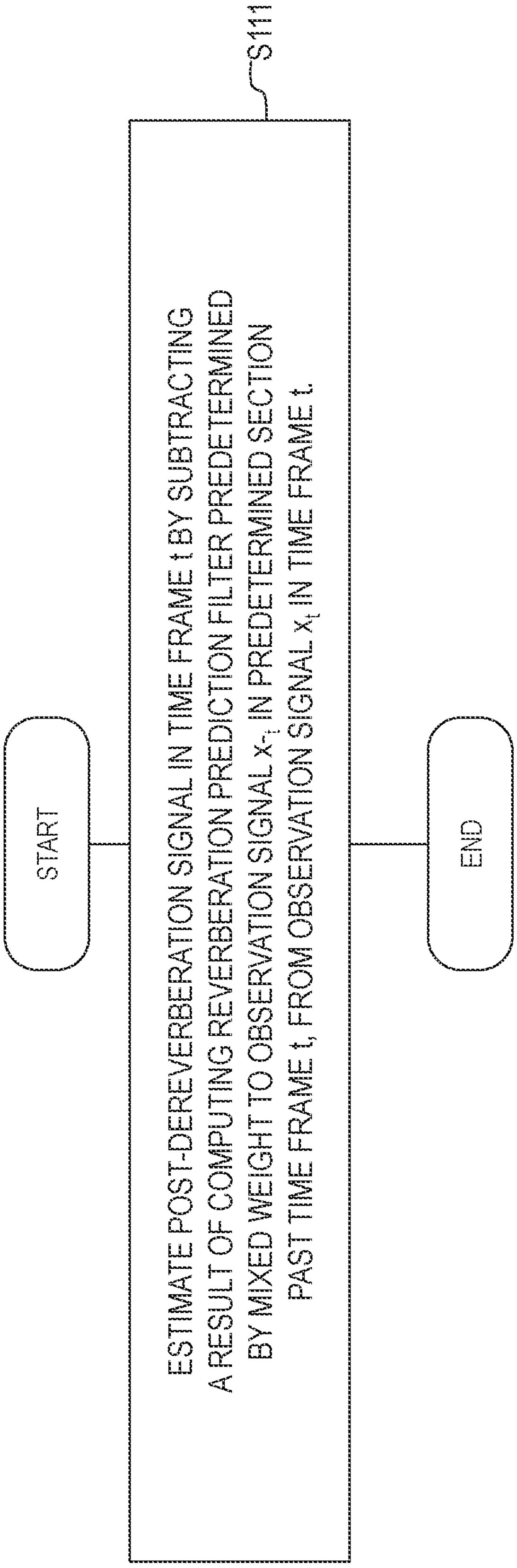
FIG. 2 is a flowchart showing an operation of the reverberation removal device according to Example 1.

The post-dereverberation signal estimation unit 111 estimates a post-dereverberation signal $z_t$ in the time frame t by subtracting the result of computing the reverberation prediction filter predetermined by the mixing weight to the observation signal $x^-_t$ in the predetermined section past the time frame t (see equation (7)) from the observation signal $x_t$ in the time frame t (S111, FIG. 2)

«Parameter Estimation Device 12»

Figure 3:
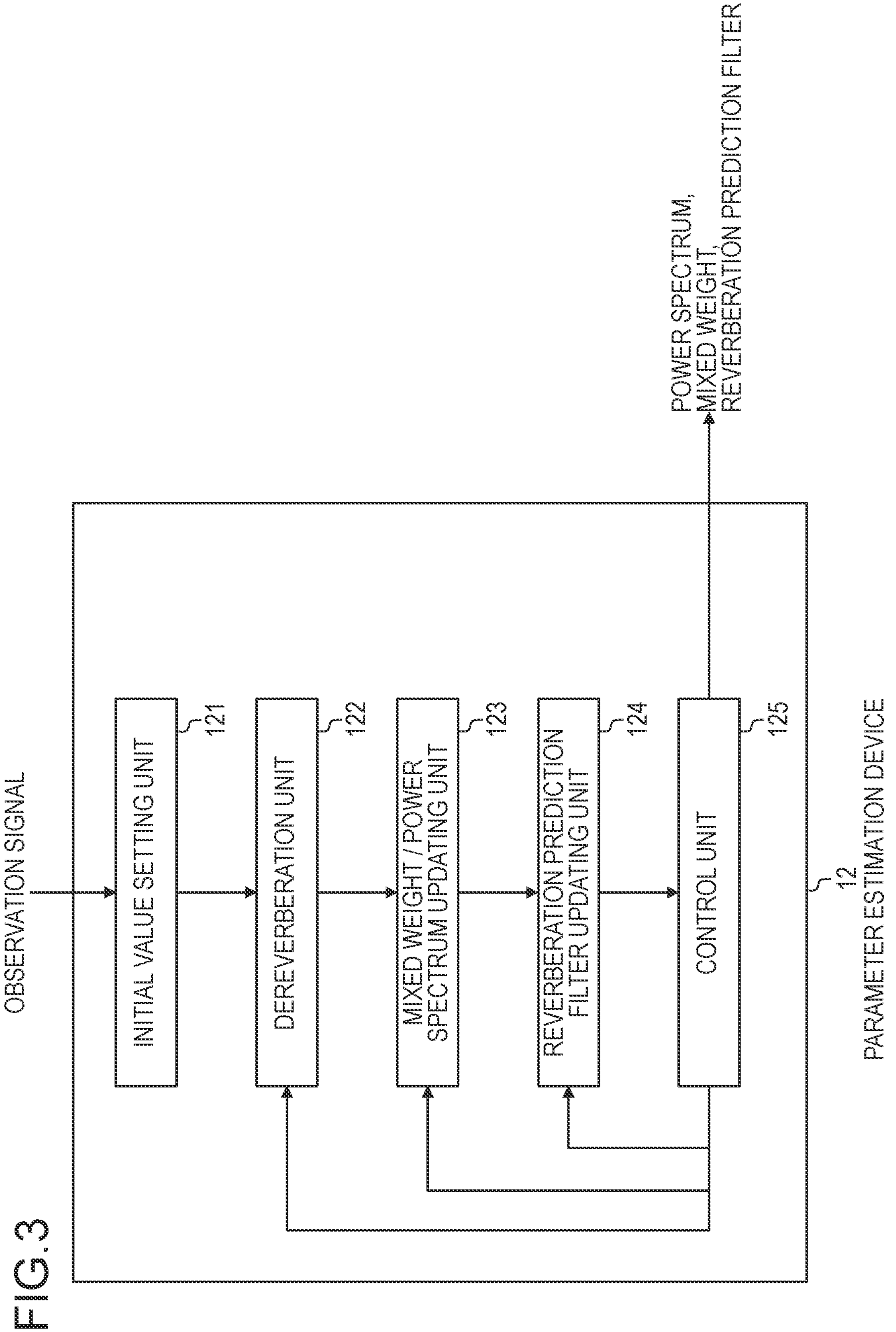
FIG. 3 is a block diagram showing a functional configuration of a parameter estimation device according to Example 1.

A functional configuration of the parameter estimation device 12 which is a device for estimating a parameter by the foregoing Switching WPE will be described hereinafter with reference to FIG. 3. As shown in the diagram, the parameter estimation device 12 of the present example includes an initial value setting unit 121, a dereverberation unit 122, a mixed weight/power spectrum updating unit 123, a reverberation prediction filter updating unit 124, and a control unit 125.

Figure 4:
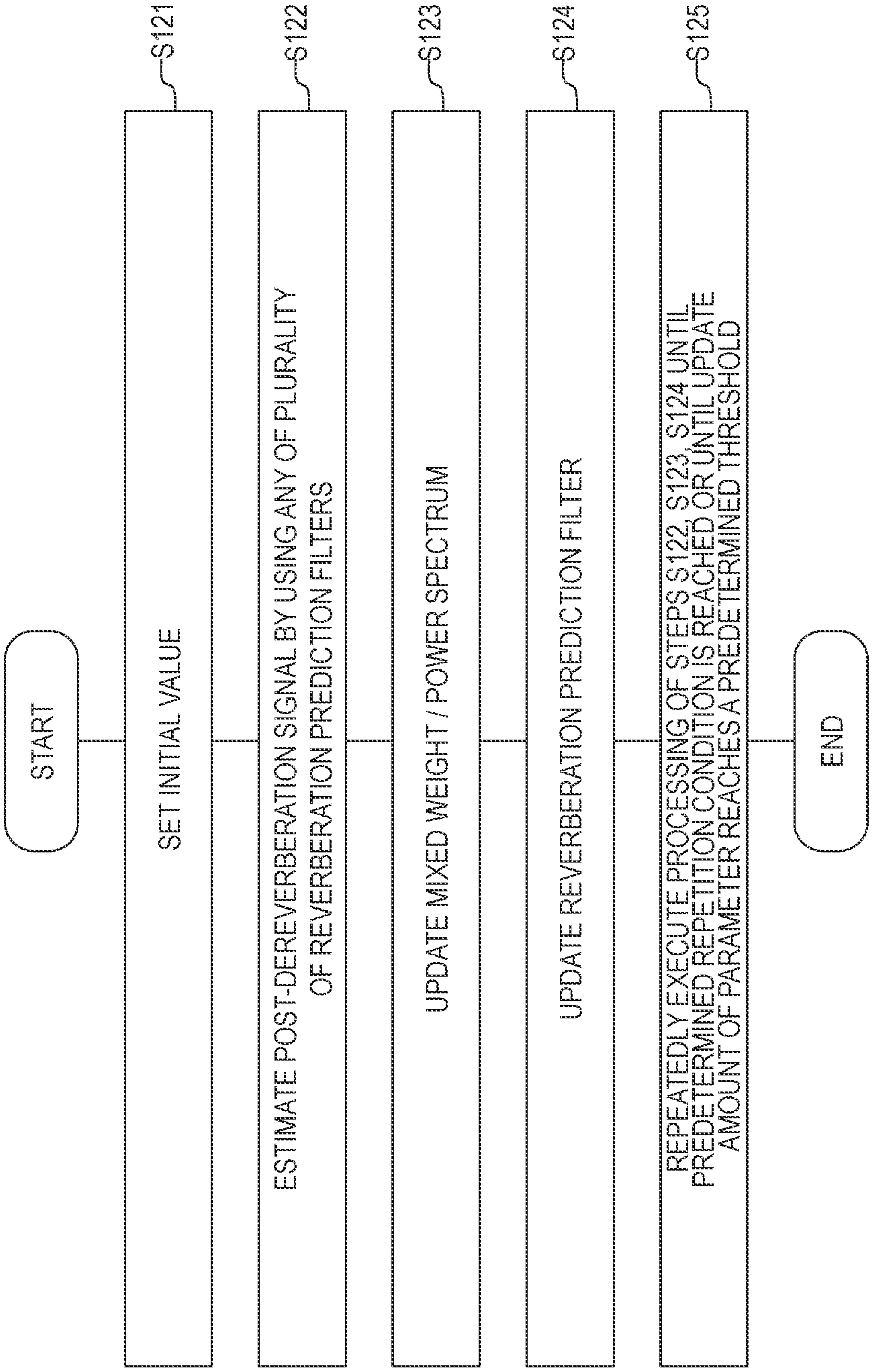
FIG. 4 is a flowchart showing an operation of the parameter estimation device according to Example 1.

Operations of the respective functional configurations will be described hereinafter with reference to FIG. 4.

<Initial Value Setting Unit 121>

The initial value setting unit 121 sets appropriate initial values to the reverberation prediction filters $G_1, \ldots, G_n$(S121)

<Dereverberation Unit 122>

The dereverberation unit 122 estimates the post-dereverberation signal $z_t$ in the time frame t by subtracting the result of computing any of the plurality of reverberation prediction filters to the observation signal $x^-_t$ in a predetermined section past the time frame t, from the observation signal $x_t$ in the time frame t (S122).

<Mixed Weight/Power Spectrum Updating Unit 123>

The mixed weight/power spectrum updating unit 123 updates a mixed weight $\alpha_t$ determining which reverberation prediction filter should be applied according to each time frequency bin, and a power spectrum $\lambda_t$ obtained after dereverberation in the time frame t (S123). Specifically, the mixed weight/power spectrum updating unit 123 updates the power spectrum λ and the mixed weight α based on equations (8) and (9).

[Math. 5]

$$i^*=\operatorname*{argmin}_i\{\|z_{t,i}\|^2\mid i=1,\ldots,c\},\tag{8}$$

-continued $$\alpha_{t,i} = \begin{cases} 1 & (\text{if } i = i^*) \\ 0 & (\text{otherwise}) \end{cases}, \lambda_t = \max\left\{\frac{1}{M}\|z_{t,i^*}\|^2, \varepsilon\right\}. \tag{9}$$

«Reverberation Prediction Filter Updating Unit 124»

The reverberation prediction filter updating unit 124 updates the reverberation prediction filters (S124). Specifically, the reverberation prediction filter updating unit 124 updates the reverberation prediction filters $G_1, \ldots, G_n$, based on equation (12) which is the optimum solution of the following equation (10).

[Math 6

$$\text{minimize } \sum_{i=1}^{n} tr\left(\begin{bmatrix} I_M \\ G_i \end{bmatrix}^h \begin{bmatrix} * & P_i^h \\ P_i & R_i \end{bmatrix} \begin{bmatrix} I_M \\ G_i \end{bmatrix}\right), \tag{10}$$

Here, * represents a matrix of size M×M, and matrices $R_i$ and $P_i$ are represented by the following equations (11) and (12).

[Math. 7]

$$R_i = \frac{1}{T}\sum_{t=1}^{T} \alpha_{t,i} \frac{\overline{x}_t \overline{x}_t^h}{\lambda_t}, P_i = \frac{1}{T}\sum_{t=1}^{T} \alpha_{t,i} \frac{\overline{x}_t x_t^h}{\lambda_t}, \tag{11}$$

[Math. 8]

$$G_i = R_i^{-1} P_i \in C^{M_p \times M} \text{ for each } i = 1, \ldots, n. \tag{12}$$

<Control Unit 125>

The control unit 125 transmits a control command for repeatedly executing processing (S122) of the dereverberation unit 122, processing (S123) of the mixed weight/power spectrum updating unit 123, and processing (S124) of the reverberation prediction filter updating unit 124, until a predetermined condition is satisfied (S125). Examples of the predetermined condition include conditions such as until a predetermined repetition condition is reached, and when an update amount of a parameter including the mixed weight $\alpha_t$, the power spectrum $\lambda_t$, and the reverberation prediction filter becomes equal to or less than a predetermined threshold.

ADDITIONAL NOTE

The device of the present invention includes, for example, as a single hardware entity, an input unit to which a keyboard or the like can be connected, an output unit to which a liquid crystal display or the like can be connected, a communication unit to which a communication device (e.g., a communication cable) capable of communicating with the exterior of the hardware entity can be connected, a CPU (Central Processing Unit, may also include a cache memory, registers, etc.), a RAM or ROM serving as a memory, an external storage device, which is a hard disk, and a bus that connects the input unit, the output unit, the communication unit, the CPU, the RAM, the ROM, and the external storage device such that data can be exchanged therebetween. If necessary, the device (the drive) capable of reading and writing a storage medium such as a CD-ROM may be provided in the hardware entity. A general-purpose computer or the like is an example of a physical entity including such hardware resources.

The external storage device of the hardware entity stores a program needed to realize the above-mentioned functions and data needed for the processing of this program (the program may be stored not only in the external storage device, but also in, for example, a ROM which is a read-only storage device). Also, the data and the like obtained through the processing of the program are stored as needed in a RAM, an external storage device, and the like.

In the hardware entity, each program stored in the external storage device (or ROM, etc.) and the data needed for processing each program are loaded to the memory as needed, and interpreted, executed, and processed by the CPU as appropriate. As a result, the CPU realizes predetermined functions (respective configuration requirements represented as . . . unit, . . . means and the like as described above).

The present invention is not limited to the embodiments described above, and can be modified appropriately within a scope not departing from the gist of the present invention. Further, the processes described in the foregoing embodiments are not only executed in chronological order in the described order, but also may be executed in parallel or individually according to a processing capability of a device that executes the processes or as necessary.

As described above, when the processing functions in the hardware entity (the device of the present invention) described in the foregoing embodiments are realized by a computer, the processing contents of the functions to be included in the hardware entity are described by a program. By executing this program on the computer, the processing functions in the above-described hardware entity are realized on the computer.

Figure 5:
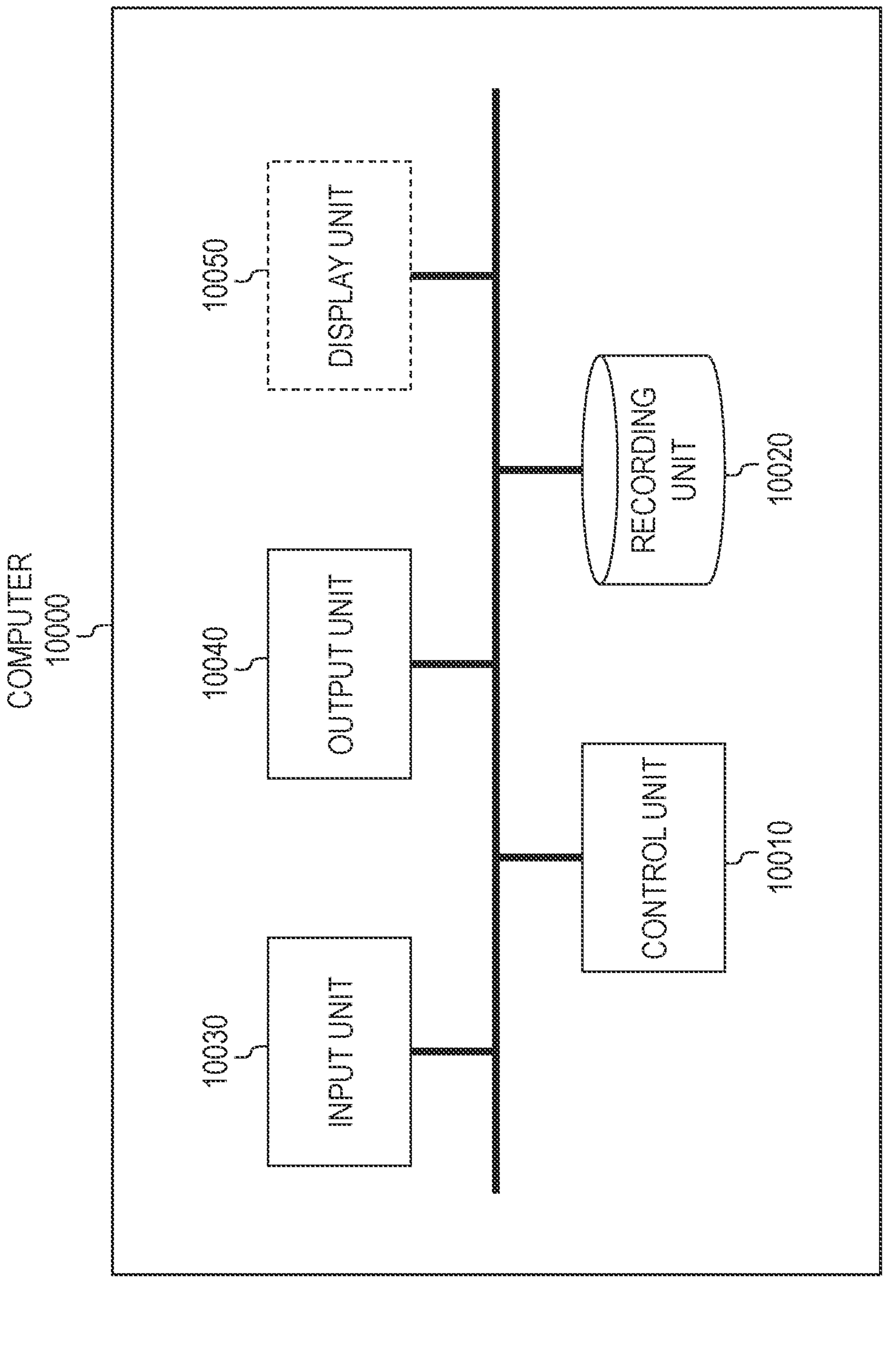
FIG. 5 is a diagram showing a functional configuration example of a computer.

The various types of processing described above can be executed by causing a recording unit 10020 of a computer shown in FIG. 5 to read a program for executing each of the steps of the method described above, and causing a control unit 10010, an input unit 10030, an output unit 10040, and the like to operate the program.

The program describing the processing contents can be recorded in a computer readable recording medium. Examples of the computer readable recording medium include a magnetic recording device, an optical disk, a magneto-optical recording medium, and a semiconductor memory. Specifically, for example, a hard disk device, a flexible disk, a magnetic tape, or the like can be used as the magnetic recording device, a DVD (Digital Versatile Disc), a DVD-RAM (Random Access Memory), a CD-ROM (Compact Disc Read Only Memory), a CD-R (Recordable)/RW (ReWritable), or the like can be used as the optical disk, an MO (Magneto-Optical disc) or the like can be used as the magneto-optical recording medium, and an EEP-ROM (Electronically Erasable and Programmable-Read Only Memory) or the like can be used as the semiconductor memory.

The program is distributed, for example, by sales, transfer, or rent of a portable recording medium such as a DVD or a CD-ROM on which the program is recorded. In addition, a configuration is possible in which the program is distributed by storing the program in advance in a storage device of a server computer and transferring the program from the server computer to another computer via a network.

A computer executing such a program is configured to, for example, first, temporarily store, in its own storage device, a program recorded on a portable recording medium or a program transferred from a server computer. Then, at the time of executing the processing, the computer reads the program stored in its own recording medium and executes the processing according to the read program. As another execution form of the program, the computer may directly read the program from the portable recording medium and execute processing according to the program, or may sequentially execute processing according to the received program every time the program is transferred from the server computer to the computer. In addition, by a so-called ASP (Application Service Provider) type service which does not transfer a program from the server computer to the computer but implements a processing function only by the execution instruction and the result acquisition, the above-mentioned processing may be executed. It is assumed that the program in the present embodiment includes data which is information to be provided for processing by an electronic computer and equivalent to a program (data or the like which is not a direct command to the computer but has a property to specify the processing of the computer).

Further, according to this aspect, the computer is caused to execute a predetermined program to constitute the hardware entity, but at least part of the processing contents may be realized by means of hardware.

The invention claimed is:

1. A reverberation removal device for removing reverberation, the device comprising a processor configured to execute operations comprising: storing the plurality of reverberation prediction filters; storing a mixed weight that determines switching to a first reverberation prediction filter of the reverberation prediction filters as one of the reverberation prediction filters to be applied according to each time frequency bin; and estimating a post-dereverberation signal $z_t$ in a time frame t by subtracting a result of computing the determined first reverberation prediction filter of the reverberation prediction filters predetermined by the mixed weight to an observation signal $x^{-}_{t}$ in a predetermined section prior to the time frame t, from an observation signal $x_t$ in the time frame t and further by switching a second reverberation prediction filter of the plurality of reverberation prediction filters to the first reverberation prediction filter of the plurality of reverberation prediction filters to remove reverberation of audio.

2. A computer-readable non-transitory recording medium storing a computer-executable program instructions that when executed by a processor cause a computer to execute as the reverberation removal device according to claim 1.

3. A parameter estimation device, comprising: processing circuitry configured to estimate a post-dereverberation signal $z_t$ in a time frame t by subtracting a result of computing a reverberation prediction filter of a plurality of reverberation prediction filters to an observation signal $x^{-}_{t}$ in a predetermined section prior to the time frame t, from an observation signal $x_t$ in the time frame t; update (i) a mixed weight $\alpha_t$ that determines which one of the reverberation prediction filters to be applied in accordance with each time frequency bin, and (ii) a power spectrum $\lambda_t$ obtained after dereverberation in the time frame t; update the reverberation prediction filters; and transmit a control command to repeatedly execute processing of the dereverberation, processing of the updating of both the mixed weight and the power spectrum steps, and processing of the reverberation prediction filter updating until an update amount of a parameter including the mixed weight $\alpha_t$, the power spectrum $\lambda_t$ and reverberation prediction filter becomes less than a predetermined threshold value.

4. A computer-readable non-transitory recording medium storing a computer-executable program instructions that when executed by a processor cause a computer to execute as the parameter estimation device according to claim 3.

5. A reverberation removal method, comprising:

a post-dereverberation signal estimation step of estimating a post-dereverberation signal $z_t$ in a time frame t by subtracting a result of computing a reverberation prediction filter predetermined by a mixed weight to an observation signal $$x_t^-$$

in a predetermined section prior to the time frame t, from an observation signal $x_t$ in the time frame t, by using the plurality of dereverberation prediction filters and a mixed weight determining switching to the reverberation prediction filter of the reverberation prediction filters to be applied in accordance with each time frequency bin and further by switching from another reverberation prediction filter to the reverberation prediction filter.

6. A parameter estimation method, comprising: a dereverberation step of estimating a post-dereverberation signal $z_t$ in a time frame t by subtracting a result of computing any of a plurality of reverberation prediction filters to an observation signal $$x_t^-$$

in a predetermined section prior to the time frame t, from an observation signal $x_t$ in the time frame t; a parameter updating step of updating a mixed weight $\alpha_t$ that determines which one of the reverberation prediction filters should be applied in accordance with each time frequency bin, and a power spectrum $\lambda_t$ obtained after dereverberation in the time frame t; a reverberation prediction filter updating step of updating the reverberation prediction filters; and a control step of transmitting a control command to repeatedly execute processing of the dereverberation step, processing of the updating of both the mixed weight and the power spectrum step, and processing of the reverberation prediction filter updating step until an update amount of a parameter including the mixed weight $\alpha_t$, the power spectrum $\lambda_t$ and reverberation prediction filter becomes less than a predetermined threshold value.

* * * * *